Figure 44:
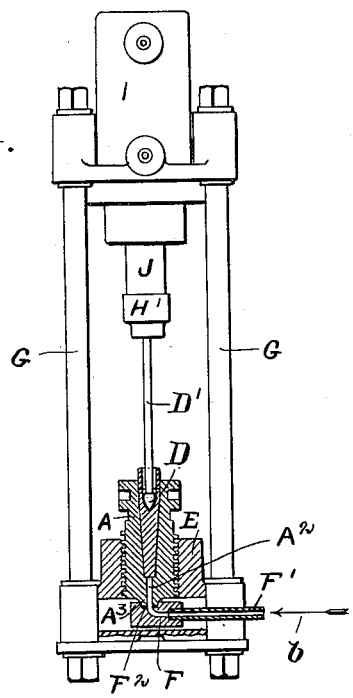

No. 629,610. Patented July 25, 1899.
J. ROBERTSON.
APPARATUS FOR SHAPING, FORGING, DRAWING, SOLIDIFYING, AND SQUIRTING METALS.
(Application filed June 14, 1897.)
(No Model.) 5 Sheets—Sheet I.
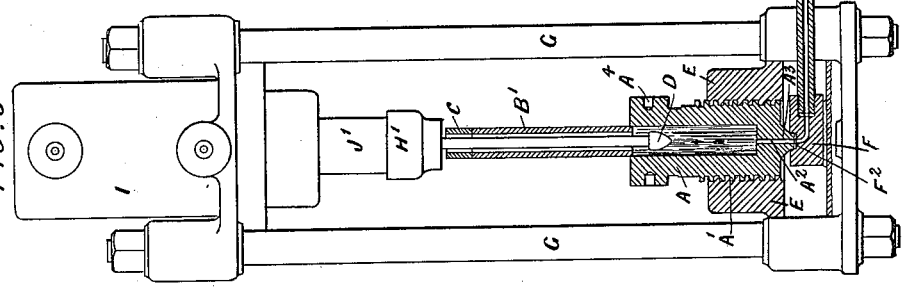
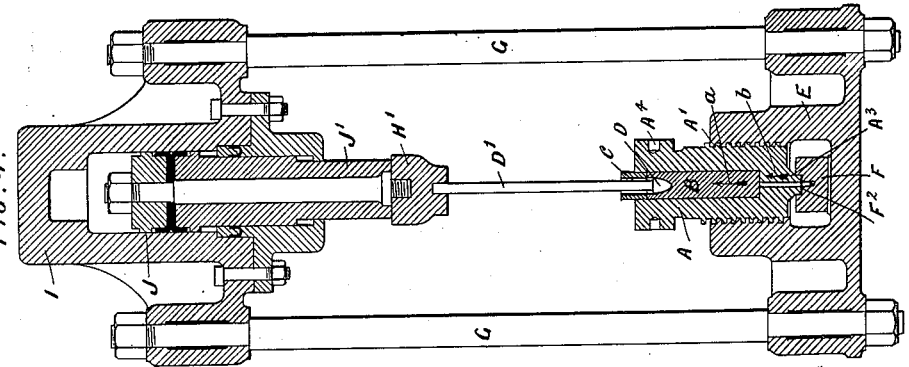
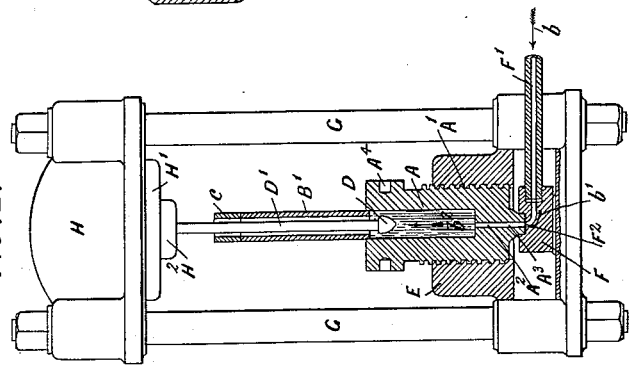
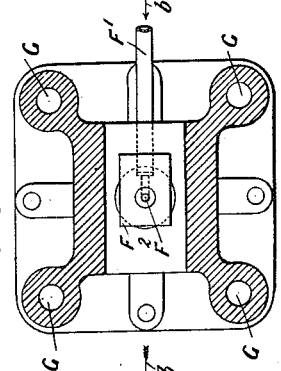
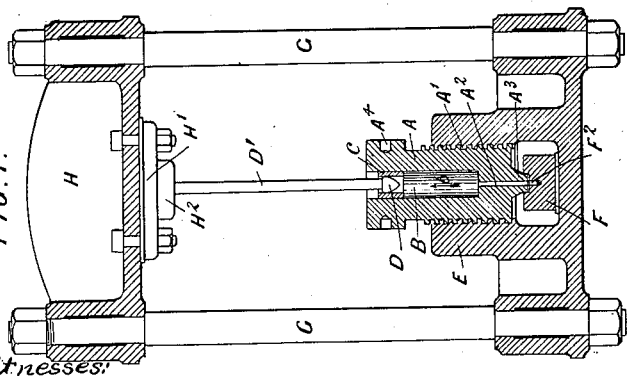
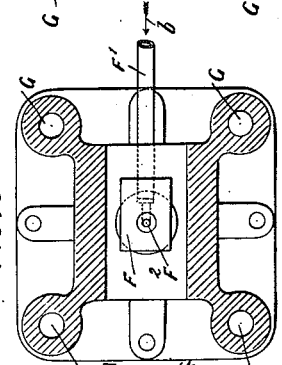
Witnesses:
A. D. Harrison.
P. W. Pezzetti.
Inventor:
James Robertson
by Wright, Brown & Quinby
Attys No. 629,610. Patented July 25, 1899.
J. ROBERTSON.
APPARATUS FOR SHAPING, FORGING, DRAWING, SOLIDIFYING, AND SQUIRTING METALS.
(Application filed June 14, 1897.)
(No Model.) 5 Sheets—Sheet 2.
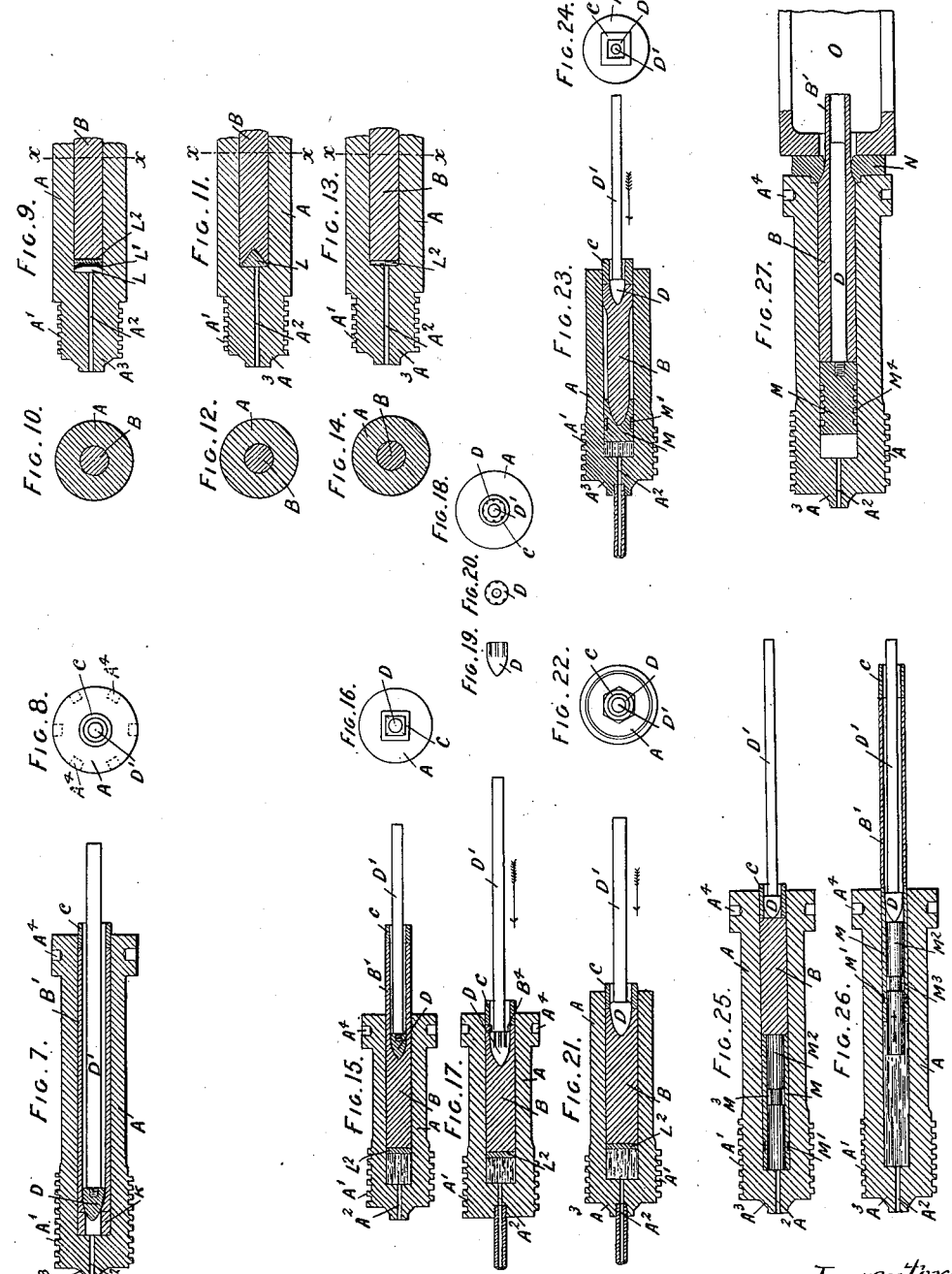

No. 629,610. Patented July 25, 1899.
J. ROBERTSON.
APPARATUS FOR SHAPING, FORGING, DRAWING, SOLIDIFYING, AND SQUIRTING METALS.
(Application filed June 14, 1897.)
(No Model.) 5 Sheets—Sheet 3.
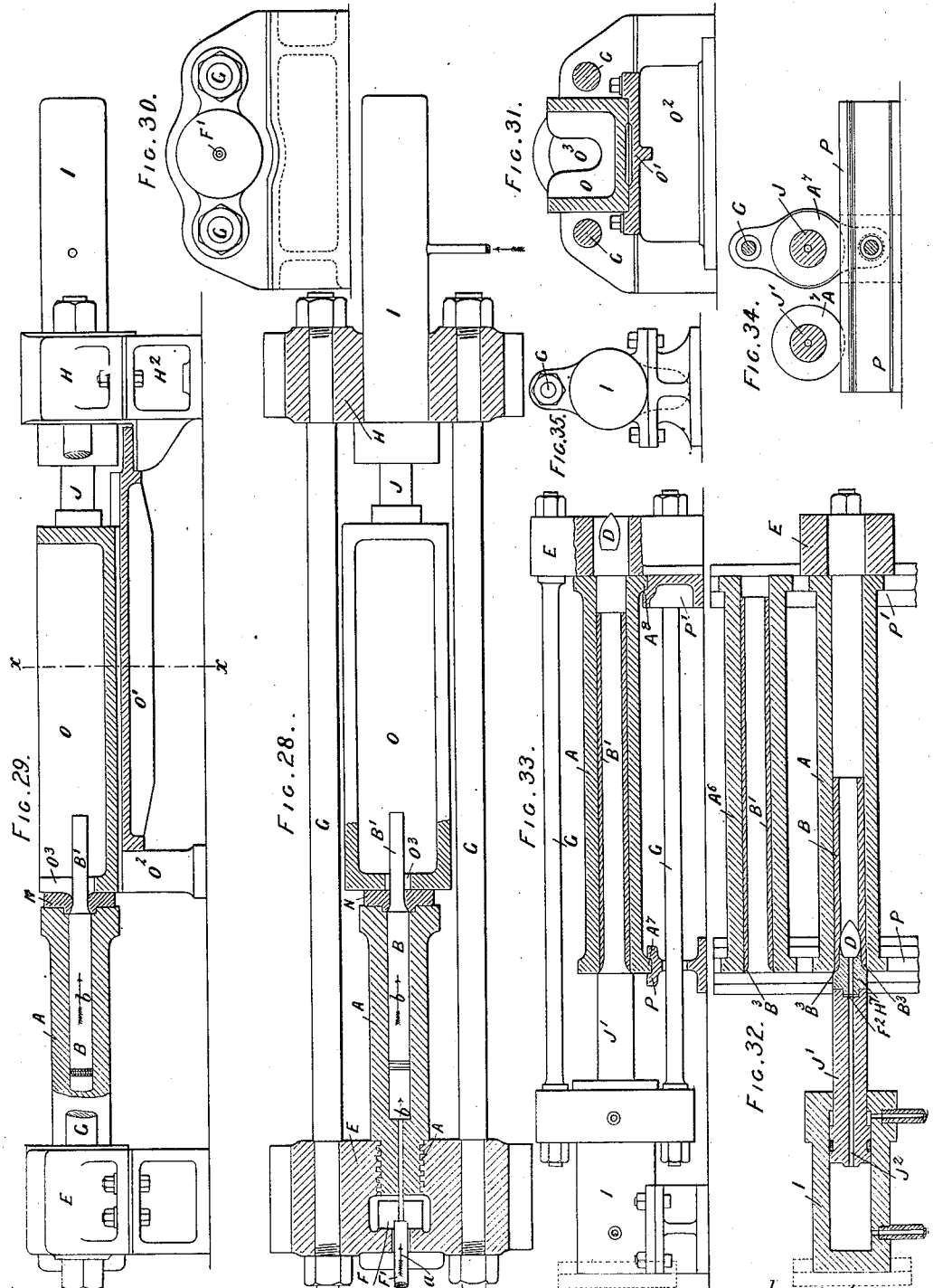

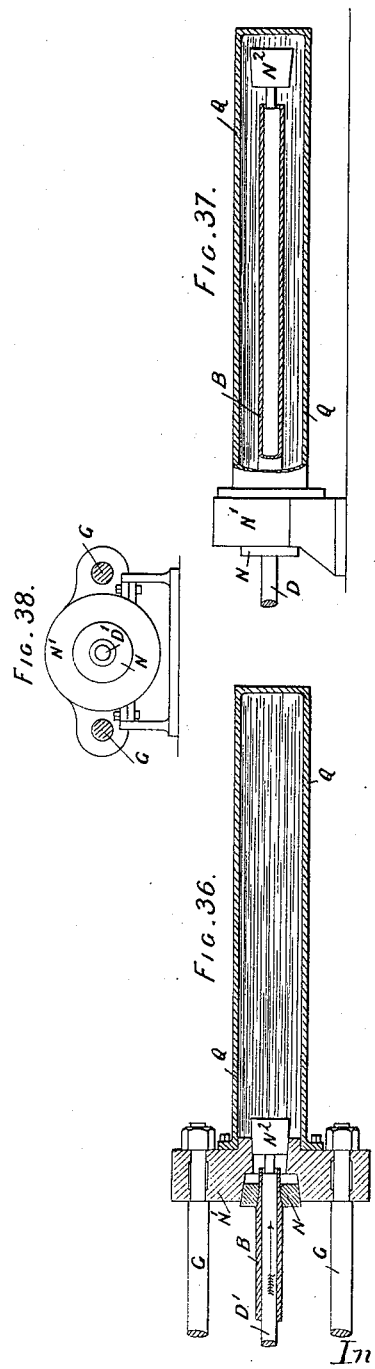

No. 629,610. Patented July 25, 1899.
J. ROBERTSON.
APPARATUS FOR SHAPING, FORGING, DRAWING, SOLIDIFYING, AND SQUIRTING METALS.
(Application filed June 14, 1897.)
(No Model.) 5 Sheets—Sheet 5.

Witnesses:
E. F. Batcheller
Peter W. Pezzetti

Inventor:
James Robertson
by Wright Brown & Quinby
Attys.

UNITED STATES PATENT OFFICE.

JAMES ROBERTSON, OF RAINHILL, ENGLAND.

APPARATUS FOR SHAPING, FORGING, DRAWING, SOLIDIFYING, AND SQUIRTING METALS.

SPECIFICATION forming part of Letters Patent No. 629,610, dated July 25, 1899.

Application filed June 14, 1897. Serial No. 640,644. (No model.)

*To all whom it may concern:*

Be it known that I, JAMES ROBERTSON, a subject of the Queen of Great Britain and Ireland, and a resident of Rainhill, England, have invented certain new and useful Improvements in Shaping, Forging, Drawing, Solidifying, and Squirting Metals and in Means and Apparatus Therefor, (for which I have obtained a patent in Great Britain, No. 3,054, bearing date February 11, 1896,) of which the following is a specification.

This invention relates to the manufacture of metal articles from metals—such as iron, steel, and copper—which when cold are of a hard nature and which become harder by pressure and hammering.

The invention relates particularly to a new and improved method of and apparatus for shaping, forging, drawing, solidifying, and squirting metals which are first rendered soft or plastic by heat and are then formed from ingots, billets, or masses into tubes, tubular or hollow articles, plates, bars, rods, wires, and the like or into blanks for the making of these. This is done by placing the billet or mass of plastic metal into a long die or container and then suddenly introducing a liquid at high pressure into the die and propelling the metal by the direct force of the liquid over or through shaping-tools, such as tube mandrels or dies, in some cases propelling the shaping-tool as well by the direct force and contact of the liquid.

The invention consists, first, in the production of metal articles from soft heated blanks or billets by confining the billet in a tubular container and acting upon the same by means of a liquid under heavy pressure introduced directly into the container.

The invention also consists in an improved method and apparatus for effecting a quick shaping action on the metal, involving the use of a rupturable diaphragm placed in the path of the propelling liquid and designed to prevent the entrance of the liquid to the die or container until the maximum or nearly the maximum pressure has been attained in the liquid-forcing apparatus, at which moment the diaphragm bursts and permits the entrance of the liquid to the container at about its maximum pressure.

The invention also consists in the use of an insulating substance or substances placed between the mass of metal and the propelling liquid to prevent the metal from becoming unduly cooled by contact with said liquid.

The invention also consists in using containers or dies for tube-making which are relatively wide at the mouth, with sides tapering instead of parallel in order to reduce friction between the billet and the sides of the container.

The invention also consists in means for readily changing, jointing, and fixing the dies in a manner suited to withstand the great pressures employed.

The invention also consists in certain other improvements employed in connection with the above-indicated processes and apparatus, all of which I shall proceed to describe and claim with the aid of the accompanying drawings, forming a part of this application.

Figure 40:
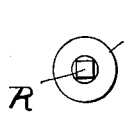
Figure 39:
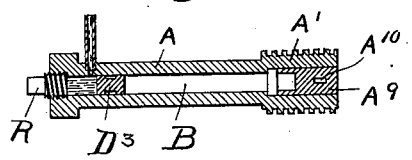
Figure 41:
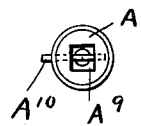
Figure 42:
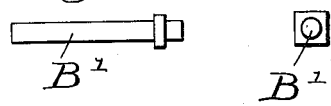

Of the drawings, Figure 1 represents a vertical section through a container constituted in accordance with my invention, showing a billet placed in the container and a mandrel in position ready to act on the billet to form the same into a tube as it exudes from the container under the impulse of the propelling liquid. Fig. 2 represents a similar view showing the position of the parts after the completion of the tube-forming operation. Fig. 3 represents a horizontal section of the apparatus, taken below the container. Fig. 4 represents a sectional view of a container and a short-stroke hydraulic ram used to force a mandrel into the billet for a short distance as a preliminary operation, which compresses the billet closely against the sides of the container. Fig. 5 represents a similar view showing the parts at the completion of the tube-forming operation. Fig. 6 represents a horizontal section similar to Fig. 3 of the latter construction. Fig. 7 represents a sectional view of a long container and mandrel, in which the mandrel is pushed almost completely through the mass of metal before the propelling liquid is caused to act. Fig. 8 represents a plan view of the container shown in Fig. 7. Figs. 9 to 14, inclusive, represent alternate vertical and horizontal sections through the lower portions of similar containers, showing different insulating substances placed between the lower end of the billet and the propelling liquid to prevent too great a loss of heat by contact of the metal with the liquid. Figs. 15 to 24, inclusive, represent views in section, plan, and elevation showing dies or containers of square and hexagonal form internally and mandrels of square and fluted form, these containers and mandrels being adapted for the production of particular shapes of tubes both externally and internally. Figs. 25 and 26 represent sectional views illustrating the employment of a tubular piston and an auxiliary piston-piece fitting therein for propelling the metal billet from the container and causing it to exude between the container and the mandrel in the form of a tube. Fig. 27 represents a sectional view, in which a reducing-die and long mandrel are used in connection with my improved direct liquid-propelling method, the object in this case being to produce a thin tube from an annular or tubular billet. Fig. 28 represents a horizontal section, partly in plan; Fig. 29, a vertical section, partly in elevation; Fig. 30, a rear elevation; and Fig. 31, a section on the line $x\ x$ of Fig. 29, illustrating a container and die for drawing solid metal bars and an improved device for readily fixing the die in place and permitting its ready removal for a recharge. Fig. 32 represents a horizontal section, Fig. 33 a longitudinal section and side elevation, Fig. 34 a transverse section, and Fig. 35 a rear elevation, of a system of interchangeable containers adapted for drawing tubes from tubular billets. Fig. 36 represents a horizontal section, Fig. 37 a vertical section, partly in side elevation, and Fig. 38 a rear elevation, partly in section, of a reducing-die and mandrel for drawing tubes from tubular billets, used in connection with a cooling-trough. Fig. 39 represents a longitudinal section, Fig. 40 a rear elevation, and Fig. 41 a front elevation, of a container and forming-tool for giving a special form to the end of a solid billet. Fig. 42 represents a side elevation, and Fig. 43 a front elevation, of a finished bar made with the apparatus shown in the last-mentioned figures. Fig. 44 represents a view in vertical section showing a container tapered on the inside.

The same reference characters indicate the same or similar parts in all the figures.

By preference in carrying out my invention I employ water as the propelling liquid at a pressure sufficient to force the metal billet over or through the forming-tool or to force the forming-tool through the billet, as the case may be. A distinguishing feature of the present invention lies in the introduction of water at a very high pressure into a container or long die in which a metal billet rendered soft by heat has previously been placed, and the expulsion of the metal, in the majority of cases, by the direct contact and propelling action of the water. In particular instances I use an insulating-body between the water and the billet, and in a few cases it is convenient to employ a sliding piston between the two; but in general the water impinges directly against the rear end of the hot billet, which latter fits closely against the interior of the container and acts upon said billet as upon a piston to force it out of the container and around or through the forming-tool.

In two previous United States Patents—namely, No. 481,060, dated August 16, 1892, and No. 524,504, dated August 14, 1894, and in other patents—I have described processes in which I introduce water under pressure directly into the interior of a container and force a billet or a formed article out of the container by the direct contact and pressure of the water. In the first of the patents mentioned I first form the article from a soft billet by forcing a mandrel or other forming-tool through or against said billet, and then after the article is formed I introduce water under pressure into the interior of the container and eject the formed article from the container by the pressure of the water against the rear end of the article, the cold water acting to cool and contract the formed article and facilitate its ejection from the container. In the second patent I form and compress a metal article by confining a blank or partially-formed mass of metal in a container at the entrance to a drawing-die and forcing a liquid against and around the length of said metal under sufficient continuously-supplied pressure to push it through the die, and thus impart to the cross-section of the metal the form of the die. The metal blank is placed in the container in a cold or nearly cold state, and the impelling liquid surrounds and is in direct contact with the blank up to the point where the latter touches the die. My present invention in that part which relates to the forcing of the metal billet from the container is entirely distinct from either of the above-mentioned inventions, as will readily appear from the succeeding description.

Referring to Figs. 1, 2, and 3 of the drawings, A designates a strong metal receptacle or container, preferably composed of steel, of round form externally and internally and of sufficient strength to withstand a very high liquid-pressure. The lower portion of the body of the container is formed with screw-threads A', which enable it to be screwed into the base-plate casting E, and its top portion is provided with a series of holes A¹, in which a hand-bar may be inserted for the purpose of screwing the container into and out of its base-plate. In these figures a water-inlet A² is shown extending from the interior cavity of the container through the bottom portion of the body and through a small tapered projection A³, formed on the bottom of the container and jointed into a steel faucet-piece F. The screw-threading of the container and base-plate affords facilities for readily changing the containers and also permits the tapered spigot-piece A³ to be very securely jointed into the faucet-piece F by screwing down the container against said faucet-piece. The base-plate E is connected, by means of four wrought-steel standards or tie-rods G, with a top plate or cross-head H, to which is affixed a holder or abutting plate H' for receiving the upper end of the mandrel stem-rod D' and supporting it and the mandrel D against the upward pressure of the exuding metal.

In Fig. 1 the apparatus is shown ready for a tube-forming operation. A billet B is shown in the container, the billet being first heated to a plastic state and then placed in the container. Then a cold ferrule or guide-piece C for centralizing the mandrel is inserted on top of the billet, and, finally, the mandrel D is placed in position above the billet, its stem-rod D' being inserted by a lateral movement in a slot in the holder H'. The mandrel and stem-rod fit loosely between the holder H' and the billet B, so as to leave a little loose play between the mandrel and billet just before the forcing-water is turned on into the container. As soon as the apparatus is thus adjusted the forcing-water under very heavy pressure is admitted to the container through an inlet-pipe F', and the billet B is forced thereby out of the container and over the mandrel D in the form of a tube B', Fig. 2. It is important in forming metal articles in this manner to have the interior of the container A kept dry for an instant after the billet B is placed in it and to have the water admitted to the container onto the hot billet as suddenly as possible and with its full speed and force. This is particularly important in operating upon metal billets of small mass, for if the water were admitted slowly at first or at a relatively low pressure the billet would not be expelled instantaneously and would have an opportunity to cool off to an injurious extent by contact with the cold water. I therefore place in the path of the water a rupturable diaphragm, which, as here shown, consists of a thin metal plate $F^2$, inserted between the spigot end $A^3$ of the container and the faucet-piece F in such a manner as to close the water-channel. The plate $F^2$ is made of such a thickness and shearing strength that when the forcing-water is admitted into the inlet-pipe F' it is restrained from entering the container A until the full requisite pressure or nearly the full pressure has been attained in the water-forcing apparatus. When this occurs, the water bursts through the plate $F^2$ and forces the billet out in the form of a tube, the propelling force being exerted in the direction of the arrows $b\ b'$ $b^2$. The complete stroke takes place in from one to three seconds, according to the length of the article being formed, and the billet loses but little heat from the contact of the water in so short a time.

In Figs. 4, 5, and 6 I show the mandrel stem-rod D', affixed to the ram of a short-stroke reversing hydraulic cylinder I. In the construction shown the ram is composed of the piston J, piston-rod J', and mandrel-holder H', and the cylinder I is secured by tie-rods G to the base-plate casting E. The purpose of this hydraulic cylinder and ram is to hold the mandrel centrally to the billet and to force the mandrel into the billet a short distance as a preliminary operation before the propelling-water is admitted. This has the effect of expanding the billet and causing it to closely fit the container, such expanding action being particularly useful when the original shape of the billet is not like that of the interior of the container. The escape of the water around the outside of the billet is thereby prevented, and the billet is also compelled to take the shape of the interior of the container. This auxiliary apparatus is preferably operated from a hydraulic accumulator.

In Figs. 7 and 8 I show a container adapted for the formation of long thin tubes directly from solid heated billets. A designates the container, and B' a tube which has been brought to a nearly-finished state by pushing the mandrel D through the solid billet until its end rests against a ferrule K in the bottom of the container. The walls of the ferrule are necessarily made thicker than the walls of the finished tube in order to withstand the pressure of the metal billet during the piercing operation, and the conical nose of the mandrel would therefore come to rest against the ferrule K before said mandrel had gone entirely through the billet, leaving a thick annular end portion $B^2$ on the tube. In order to finish the tube, water at a high pressure is introduced into the container at or just before the completion of the piercing stroke, and the tube B' is thereby forced out over the mandrel D in a complete state.

As a means for relieving to some extent the friction of the metal billet on the sides of the container I show in Fig. 44 a container A, having a slightly conical or tapered internal bore, making the container wider at the mouth than at the bottom. The apparatus may be organized, as shown, with a hydraulic cylinder and ram similar to that shown in Figs. 4 and 5, so that when the soft heated billet is placed in the container a short preliminary stroke may be given to the mandrel in order to force the metal of the billet close against the sides and bottom of the container. Then when the propelling-water is introduced the billet is forced out over the mandrel into a tube which is both internally and externally parallel, the taper bore of the container serving to relieve the frictional hold of the billet upon the sides of the container and prevent packing of the soft metal against the sides as it moves outwardly. The degree of taper given to the bore of the container may vary considerably. Thus a difference in diameter of one-fourth of an inch between the mouth and the bottom in a bore thirty inches long and five or six inches average diameter will relieve the friction to a marked degree and permit of the formation of very long tubes, while, on the other hand, the taper may be increased for particular classes of work, so that the internal sides of the container, if produced to meet, would form an angle with each other of fourteen degrees or thereabout. The billets used in these tapered containers may be either parallel-sided or tapered to conform to the container.

In forming tubes by the use of tapered containers, as above described, the propelling-water exerts a staving action on the soft billet as it moves outwardly, causing the rear end thereof to expand in diameter as the wider portions of the bore are reached, and thus fit the container closely throughout the forming stroke.

The containers which I have thus far described may be used in any posture for the manufacture of metal articles, although the vertical posture is best suited for insulating the metal billet from the propelling-water. When the water is introduced into the container, a portion of it is instantly converted into steam by contact with the hot billet, and this layer of steam between the billet and the water serves to insulate the former to some extent. In operating with billets of large diameter enough steam is generated to effectually insulate the billet during the short time required to shape the article; but with billets of small diameter it is sometimes necessary to use an additional insulating substance. This may take the form of a thin layer of material having low heat conductively, such as wood or graphite, or it may be a lubricating substance which is not readily combustible or a substance which generates an insulating-gas by contact with the hot billet. When wood is used for this purpose, it may be treated with creosote or other fireproofing material in order to render it less combustible.

In Figs. 9 and 10 I show in the bottom of the container A a metal plate L, rounded on its upper side, and above that a thin cup-shaped metal plate L', and above the latter, next to the billet B, a thin board of wood L². During the formation and discharge of the tube or other article from the container the plates L L' do not get materially injured; but the wood L², which is from a half-inch to an inch thick, is almost entirely destroyed by the great pressure and heat.

In Figs. 11 and 12 I show a conical cast-metal insulating-piece L in the bottom of the container. When the billet B is pressed down into the container by the action of a mandrel attached to a hydraulic ram, as shown in Fig. 4, a conical recess is formed in the bottom of the billet, and the water upon entering tends to expand out the metal of the billet and make it water-tight against the walls of the container.

In Figs. 13 and 14 the insulating substance is merely a piece of wood L² about an inch thick placed in the bottom of the container. It is unimportant that this piece should fit the container accurately.

In Figs. 15 to 24 I show containers and mandrels whose forming-surfaces are of various shapes in cross-section. In Figs. 15 and 16 an internally-square container and a square mandrel are used, these being well adapted for making hollow square building lintels and beams. In Figs. 17 to 20 the container is round internally and the mandrel D is fluted. This form of apparatus produces internally-fluted tubes suitable for small steam-boilers where great heating-surface is required in the tubes. In Figs. 21 and 22 I show an internally-hexagonal container and a round mandrel suitable for forming long tubes to be cut into short lengths, as blanks for screw-bolt nuts and like articles. In all these forms the billet is originally shaped to conform approximately to the shape of the container. In some cases, however, it is desirable to use a billet of a different shape in cross-section from the container. Figs. 23 and 24 show a square billet B placed in an internally-round die A. When the billet is forced out of the container around the mandrel D, it has a chance to expand and fill the mouth of the container, so as to form a round tube. By this arrangement a large part of the friction ordinarily due to the passage of the billet through the container is eliminated. In forming articles by this latter method in order to prevent the propelling-water from entering too copiously between the flat sides of the billet and the walls of the container it is necessary to employ a packed piston-piece, against which the water presses and which presses against the rear end of the billet and forces the same out of the container. M, Fig. 23, designates a piston-piece provided with a peripheral groove, in which is placed a water-tight packing M'. The forward end of the piston-piece is recessed to receive the mandrel D at the end of the forming stroke.

In Figs. 25 and 26 I show an arrangement similar to that just described, but with a modified form of the piston. The piston here shown consists of two parts, an outer tubular packed piston-piece M of the same thickness as the tube to be formed and an inner solid piston-piece M², provided with a packing M³ and of the same diameter as the mandrel D. Fig. 26 shows the parts at the completion of the tube-forming operation, the inner piece M² having been arrested by the mandrel D and the outer tubular piece having advanced farther and pushed the finished tube B' out of the container.

In Fig. 27 I show an apparatus for squirting out a tubular billet B over a long mandrel D and through a drawing-die N to form a thin tube B'. The mandrel is screwed into a piston-piece M, which is made a good working fit to the container A, but is not packed, being provided instead with a series of peripheral grooves M⁴, which serve to retard the propelling-water from passing the piston-piece for a sufficient length of time to complete the tube-forming operation. This grooved construction of the piston-piece without packing is applicable to the other forms of pistons which I have shown.

Figs. 28 to 31 show a form of apparatus suitable for drawing solid bars of hot metal as well as tubes and other parallel-sided articles. In this form, as in that just described, a short drawing-die N is affixed to the mouth of the container A and the metal is forced through this die by the propelling-water. An improved method of fixing the die N consists in holding it against the face of the container A by means of a sliding head O, which is operated by a ram J and hydraulic cylinder I, somewhat similar to the hydraulic ram and cylinder shown in Fig. 4. A flange on the rear face of the die fits in a recess at the mouth of the container and prevents lateral displacement of the die. When the forming operation has taken place, the head O is retracted, the die N removed, and the container charged with a fresh billet in readiness for another operation. A slot $O^3$ in the end wall of the head O permits the ready insertion of fresh billets into the container and the ejection of the formed articles. The bottom of the head O is planed, so as to slide freely over a planed bed $O'$, which is supported between stools $H^2$ and $O^2$. The aperture of the die N may have almost any shape, so as to produce square, triangular, rail-shaped, flat, or other forms of bars, plates, rods, wires, &c.

In Figs. 32 to 35 I show an apparatus for drawing out heated metal tubes to thin gages. A designates a tubular container open at both ends and provided with end flanges $A^7 A^8$, which fit into grooved tracks $P P'$. In charging the container a tubular hot billet or blank B is inserted by hand and a short mandrel D is then pressed by hand a short distance into the mouth of the billet. The orifice of the container is slightly flared or bell-shaped, as shown, in order to afford an anchorage for the rear end of the billet B, which is made correspondingly bell-shaped at $B^3$ by the pressure of a breech-piece $H^7$. The latter is inserted in the orifice of the container after the mandrel D has been inserted and is then pressed against the billet and the mouth of the container by force exerted on the piston $J^2$ and piston-rod $J'$ of a short-stroke reversing hydraulic cylinder I. Since but little force is required from the hydraulic cylinder to properly seat the breech-piece $H^7$ in the mouth of the container and a much greater force is required to propel the mandrel, I insert a thin diaphragm or bursting-plate $F^2$ between the breech-piece and piston-rod $J'$, which holds back the water from entering the container until the breech-piece has been pressed into place. The pressure of the forcing-water is then suddenly increased and the water ruptures the plate $F^2$ and impinges against the rear end of the mandrel D, forcing said mandrel through the tubular billet B and out at the other end of the container. In practice it is desirable to provide an arresting plate or block, preferably of wood, against which the mandrel may strike as it leaves the container. It will readily be seen that this method of drawing thin tubes affords ample support for the hot tube both behind and in front of the traveling mandrel and reduces the tendency of the tube to break transversely by reason of the drawing tension of the mandrel. In the plan view, Fig. 32, two containers A and $A^6$ are shown, the container A being placed in operative position ready for a tube-forming operation, while the container $A^6$ has been rolled aside and is shown as containing a finished tube $B'$, which is ready to be removed. Thus a means is afforded for readily and quickly changing, charging, and discharging the containers. The containers do not require any other fixing when in operative position than their frictional hold on the face of the cross-head E due to pressure upon the piston-rod $J'$. Tubular containers mounted in the manner above described could also be operated in connection with the pushing draw-bench described in my British Patent No. 15,752 of 1884.

In Figs. 36 to 38 I show an apparatus for cooling and increasing the tensile strength of tubes drawn over long mandrels by my improved methods. N designates a short externally-tapered drawing-die held in a steel cross-head $N'$. To the other side of said cross-head is bolted a water-trough Q, which in practice is open at the top and is filled with cold water above the level of the tube which is being drawn. A wooden plug-piece $N^2$ is inserted in the exit-opening of the cross-head $N'$ previous to the drawing operation in order to keep the die N dry until the mandrel D and billet B are inserted into it. The end of the mandrel displaces the plug as the tube and mandrel advance, and the water then surrounds the tube up to the die N, thereby instantly cooling it as it issues from the die.

Figure 43:

In Figs. 39 to 43 I have illustrated a modification of my invention consisting of an apparatus for forming a boss on a metal article. For this purpose the outflow of the metal from the container is at first obstructed by a forming tool or die, which shapes the billet in the desired manner and then gives way as the propelling pressure increases. The apparatus here shown is suited for making a square boss near the end of a round solid bar. Figs. 42 and 43 show the finished bar $B'$, which is round from $f$ to $g$, square from $g$ to $h$, and round from $h$ to $i$. The interior of the container A is square from $i$ to $k$ and is round for the rest of its length. $A^9$ designates an externally-square forming-tool, which is held in place in the mouth of the container by a cotter-pin $A^{10}$. When the said tool or block is in place, a space is left between its left-hand end and the point $i$ for the formation of the square boss on the bar and the block is provided with a circular recess to form the round portion of the bar forward of the boss. In forming bars with this apparatus a round billet is first inserted in the left-hand end of the container, and that end is afterward closed with a breech-piece R. A short packed piston-piece D² is shown inserted in the container behind the billet. The forcing-water is admitted through the pipe F' and first moves the billet against the forming-tool A⁹ to form the boss on the bar. Then the pressure is increased until sufficient force is attained to overcome the shearing strength of the cotter A¹⁰. When this breaks, the formed bar, shaping-tool, and piston-piece are all expelled from the container together. A variety of shapes may be given to the ends of solid or hollow articles by using suitably shaped and arranged forming-dies and containers in an apparatus such as I have described.

I claim—

1. That improvement in the art of forming metal articles which consists in heating a metal blank to softness, placing the same in a container, introducing a propelling liquid under heavy pressure into the interior of the container, forcing the blank closely against the sides of the container, and shaping the blank by producing the action thereon of a suitable shaping tool or member through the force of the propelling liquid.

2. That improvement in the art of forming metal articles which consists in heating a metal blank to softness, placing the same in a container, introducing a propelling liquid under heavy pressure into the interior of the container, forcing the blank closely against the sides of the container, and compressing the blank between a suitable shaping tool or member and the sides of the container, by the propelling force of the liquid.

3. That improvement in the art of forming metal articles which consists in heating a metal blank to softness, placing the same in a container, introducing a propelling liquid under heavy pressure into the interior of the container, forcing the blank closely against the sides of the container, and expelling the blank from the container against and past a suitable shaping tool or member by the propelling force of the liquid.

4. That improvement in the art of forming metal articles which consists in placing a metal blank softened by heat in a container which has connection by a conduit with a liquid-forcing apparatus, obstructing the conduit at a point near to the interior of the container, forcing liquid from the said apparatus against the obstruction, displacing the obstruction by the pressure of the liquid, so as to effect a sudden entrance of the liquid into the container, and finally shaping said blank by producing the action thereon of a suitable shaping tool or member through the propelling force of the liquid.

5. That improvement in the art of forming metal tubes which consists in placing a metal blank softened by heat in a container, forcing a mandrel partially through the blank in order to cause the same to fit the container closely, and completing the tube by introducing a liquid under heavy pressure into the interior of the container, and forcing the remainder of the blank past the mandrel.

6. That improvement in the art of forming metal articles which consists in placing a metal blank softened by heat in a container, shaping the same by producing the action thereon of a suitable shaping tool or member through the propelling force of a liquid introduced under heavy pressure into the interior of the container, and insulating the blank in a suitable manner, in order to preserve it from the cooling action of the liquid.

7. That improvement in the art of forming metal tubes which consists in placing a metal blank softened by heat in a container whose bore widens toward the mouth, and forcing the blank out of the container around a mandrel by means of a liquid introduced at heavy pressure into said container, the liquid acting to stave or expand out the soft metal against the sides of the container as the blank moves from the narrower to the wider portions of the bore.

8. That improvement in the art of forming metal tubes which consists in placing a metal blank softened by heat in a container, supporting the blank free from the bottom of the container, forcing a mandrel into the blank to or nearly to the point of support, introducing a liquid under heavy pressure into the container, and forcing the remainder of the blank past the mandrel by the propelling force of the liquid to complete the tube.

9. In an apparatus of the character described, in combination, a base constructed with a screw-threaded socket, a container formed internally to receive a metal blank and having a screw-thread adapting it to be screwed into the socket in the base, a suitable shaping tool or member, and means for introducing a propelling liquid under heavy pressure into the interior of the container, so as to force the blank therefrom past the shaping-tool and thereby shape said blank.

10. In an apparatus of the character specified, a base, a container removably secured thereto, means for introducing a liquid under pressure into the interior of the container, a forming member or tool, a reversible tool-operating device comprising a cylinder having two liquid-inlets and a piston connected with the tool and adapted to force the same in the direction of the container, and to be retracted in a reverse direction, and a framework connecting the base and the cylinder.

11. In an apparatus of the character described, in combination, a base constructed with a screw-threaded socket, a faucet-piece supported beyond said socket, the said faucet-piece being constructed with a liquid-passage and being adapted to be connected with a liquid-supply pipe, and a container formed internally to receive a metal blank and constructed with a passage for the introduction of liquid into its interior, the said container having a screw-threaded portion adapting it to be screwed into the base and against the faucet-piece, so that its liquid-passage will form a continuation of the liquid-passage in the faucet-piece.

In testimony whereof I have signed my name to this specification in the presence of two subscribing witnesses.

JAMES ROBERTSON.

Witnesses:
 ARTHUR C. HALL,
 JOHN W. THOMAS.